No. 623,178. Patented Apr. 18, 1899.
P. W. PETERS.
DETACHABLE SADDLE POMMEL.
(Application filed Jan. 24, 1898.)
(No Model.)
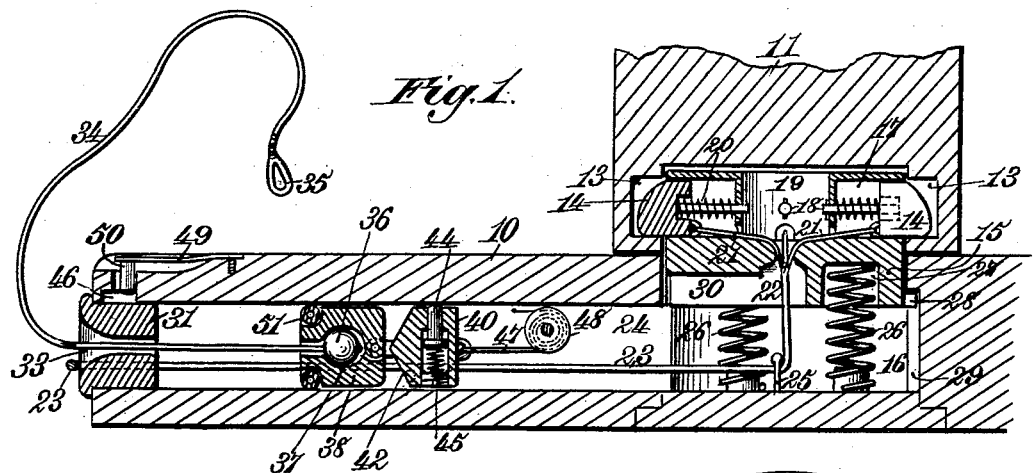
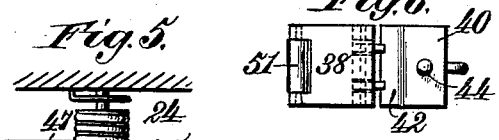
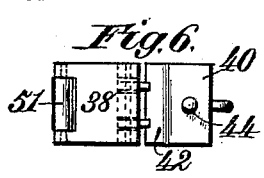
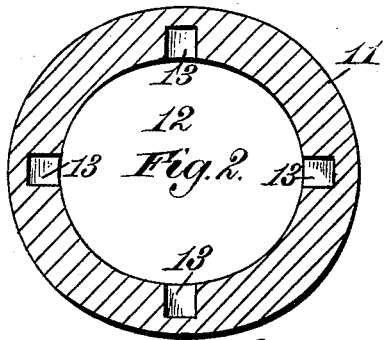
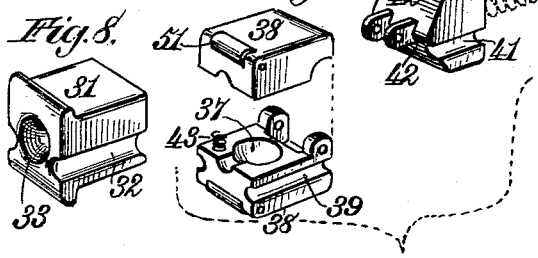
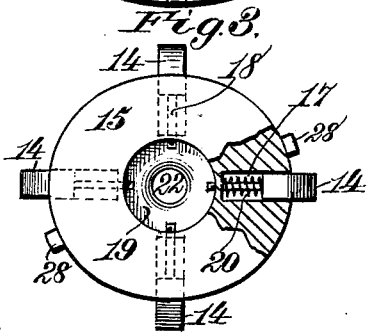
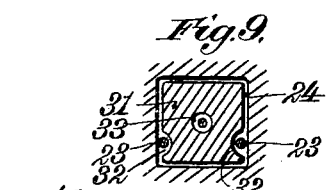
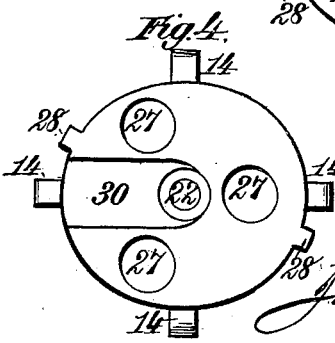
Witnesses
Robert Everett
F. B. Keefer
Inventor
Perlai W. Peters.
By James L. Norris
Atty.
THE NORRIS PETERS CO., PHOTO-LITHO., WASHINGTON, D. C.

UNITED STATES PATENT OFFICE.

PERLAI W. PETERS, OF WASHINGTON, DISTRICT OF COLUMBIA.

DETACHABLE SADDLE-POMMEL.

SPECIFICATION forming part of Letters Patent No. 623,178, dated April 18, 1899.

Application filed January 24, 1898. Serial No. 667,770. (No model.)

*To all whom it may concern:*

Be it known that I, PERLAI W. PETERS, a subject of the Emperor of Germany, residing at Washington, in the District of Columbia, have invented new and useful Improvements in Detachable Saddle-Pommels, of which the following is a specification.

This invention relates to safety appliances for riding-saddles, and has for its object to provide a detachable saddle-pommel of such nature and construction that should a lady rider fall from the saddle the said pommel will be simultaneously disconnected from the saddle-bow, so as to be rendered capable of sliding off, thus offering no obstruction or immovable projection on which the riding-habit or other garment might become entangled, with consequent risk of dragging the unseated rider. It is well known that on a lady's saddle the usual rigidly-attached pommel is liable to become a source of great danger by catching into the clothing, and thereby causing the rider to be dragged or thrown violently in case of a fall or when unseated from any cause.

My invention provides a detachable pommel that becomes instantly disconnected and freely movable from the saddle whenever the rider is thrown, while at all other times the pommel remains safely in its normal position and is in every way adapted to furnish the necessary assistance to a lady rider.

In the annexed drawings, Figure 1 is a sectional view of part of a riding-saddle and detachable pommel, together with automatic pommel attaching and detaching mechanism, illustrating the principle of my invention. Fig. 2 is a horizontal section of a detachable saddle-pommel. Fig. 3 is a part-sectional plan of a retractable bolt-carrying dowel. Fig. 4 is an inverted plan of said dowel. Fig. 5 is a view of an automatic take-up device. Fig. 6 is a plan of a coupling device. Fig. 7 shows the parts of the coupling separated and indicates in dotted lines a modified form of take-up. Fig. 8 is a view of a grooved and perforated plug for one end of the conduit or guideway in which the coupling and take-up devices are placed. Fig. 9 is a cross-section of said conduit and plug.

In carrying out my invention I provide on the saddle 10 a detachable pommel 11, that may have any usual or convenient form suitable for giving a lady required assistance in maintaining a proper and comfortable riding position. The base of the pommel 11 is provided with a preferably circular recess 12, from which radiate a plurality of bolt-sockets 13 to receive spring-projected bolts 14, carried on a retractable dowel 15, that is yieldingly supported in a recess or chamber 16 of the saddle-bow. The normally-projecting portion of the dowel 15 is provided around its periphery with a series of radially-arranged sockets 17 to serve as housings for the several radially-arranged bolts 14, each of which has a stem 18, that is adapted to extend through an aperture in the rear of such housing, and thus project into a central recess 19 of the said dowel when the several bolts 14 are retracted. A spring 20 surrounds each bolt-stem 18, with bearings against each bolt and its housing, so as to normally project the bolts 14 into locking engagement with the bolt-receiving sockets 13 of the detachable pommel. The face of each bolt 14 is beveled off, as shown, so that by forcing the pommel 11 down onto the beveled bolt-faces the bolts will recede until the pommel-bolt-receiving sockets 13 are brought into coincidence with the outer ends of the bolts, which will then immediately spring into locking engagement with said sockets, and thus firmly secure the pommel onto the saddle.

To the rear of each bolt 14 there is secured a cord 21, that is led out from the bolt-socket or housing 17 through an opening in its rear end and thence through the dowel-recess 19 to a perforation 22 in the axis of the retractable dowel. In or near this perforation 22 the several bolt-retracting cords 21 converge and connect with a main retracting-cord 23, that is extended outward through a conduit 24, with which the dowel-receiving chamber 16 communicates. Any suitable guide or guides, as 25, may be provided for the cord 23—say, for instance, one or more staples conveniently located in the dowel-receiving chamber.

The retractable dowel 15 may be supported on a plurality of spirally-coiled springs 26 or other elastic devices, and the dowel may be provided with recesses 27 to engage the said yielding supports. One side of the retractable dowel 15 may have thereon a lug 28, one or more, engaged in a guideway 29 to prevent turning of the dowel on its axis and more particularly to serve as a stop for limiting the outward movement of the dowel from the recess in which it is placed. The dowel 15 may be provided with a recess or bifurcation 30 to enable it to straddle the main retracting-cord 23 when the dowel and attached bolts 14 are drawn fully inward and clear from engagement with the detachable pommel, which can thus slide off from the saddle without obstruction.

For the purpose of automatically exerting a pull or draft on the main retracting-cord 23, so as to thereby disengage the bolts 14 and dowel 15 from the pommel 11, there is provided an automatically-actuated pull mechanism, placed in the conduit or guideway 24 and which is adapted to detachably connect with a button or other fastening on the dress of the rider and be automatically uncoupled or released as soon as the pommel is disengaged. This pull mechanism may comprise a plug 31, inserted in the open end of the conduit 24 and having grooves 32, in which a loop or bight of the main retracting-cord 23 is detachably received. The plug 31 is provided with a central perforation 33, through which a cord 34 is loosely passed. One end of this cord 34 may have a loop 35 for detachable connection with a button or other fastening on the riding-habit, or the said cord 34 may be attached to the rider in any convenient manner. To the other end of the cord 34 there is secured a ball 36, that is normally engaged in a socket 37, partly formed in each of two pivotally-connected jaws 38, that are adapted to slide back and forth in the conduit 24, into which they are fitted in such manner as to be held normally closed around the said ball. One of these ball-confining jaws 38 is provided with guide-grooves 39 for the two sides of the main retracting-cord 23. At their rear or inner side the two jaws 38 are pivotally coupled to a slide-block 40, that is also freely movable back and forth within the guideway or conduit 24. The opposite sides of this slide-block 40 are provided with guide-grooves 41 for the main retracting-cord 23, so as to be capable of moving along the same. One side of the block 40 is double inclined, so as to present beveled surfaces 42 next to the ball-confining jaws 38, thereby permitting them to open freely and readily release the said ball whenever the jaws are withdrawn from within the conduit. A spring or springs 43 may be arranged between the two pivotally-connected jaws 38 to insure a quick opening of the jaws and consequent release of the ball 36 as soon as the said jaws are free from the walls of the conduit. In the slide-block 40 there is mounted a spring-actuated bolt or locking-pin 44, that is normally pressed inward by contact with the conduit-wall. When the jaws 38 and block 40 have been drawn outward a sufficient distance to eject the plug 31 and release the ball 36 and attached cord 34, the bolt 44 will be forced by its spring 45 into locking engagement with a slot 46, that is formed in the wall of the conduit or guideway 24 near its end. Thus the slide-block 40 is prevented from being withdrawn from the conduit, and it is likewise prevented from being drawn again into said conduit by the normally-acting take-up to be presently described. It will be understood that as the plug 31 is being forced out it draws on the main retracting-cord 23, thereby drawing the bolts 14 and retracting also the dowel 15, so that the pommel 11 will be instantly released and permitted to slide off from the saddle in case the rider should fall or be thrown.

The slide-block 40 has connected therewith a take-up 47, that may consist of a cord secured to said block and to a spring-reel 48, mounted in the conduit or guideway 24, as shown in Figs. 1 and 5 or as indicated by dotted lines in Fig. 7. A simple drawing-spring 47$^a$ may be employed as a take-up.

In connecting up the parts of the automatic pull mechanism the ball 36 will be placed between the jaws 38, while the block 40 is held locked by engagement of its bolt 44 in the slot 46, and now by pressing on a spring 49 an attached pin 50 will force the bolt 44 out from the slot 46, and thereupon the take-up device will draw the coupled-together block 40, jaws 38, and confined ball 36 into the conduit. Meanwhile the bight of the main retracting-cord 23 should be drawn outward and placed in the grooves of the plug 31 as the latter is slipped along the cord 34 and inserted into the end of the conduit. The pommel 11 having been forced into secure locking engagement with the bolts 14, the lady may now mount and should attach the cord 34 to some suitable part of her dress. Now if the rider should fall from the saddle the cord 34 and attached ball 36 will draw the jaws 38 forward into forcible contact with the plug 31, thereby ejecting the same, so as to cause the said plug in its outward movement to draw upon the cord 23, and thus quickly release the pommel-attaching devices. Thus the detached pommel will be free to fall off with the rider. As soon as the outward-moving jaws 38 have cleared the end of the conduit they will fall apart, thereby releasing the ball 36 from between said jaws. The ejected plug 31 will be retained on the cord 34 by reason of the ball 36 being secured to the cord-end, and thus the cord 34, plug 31, and ball 36 will fall off together with the rider and entirely free from the saddle. The jaws 38 cannot return into the conduit so long as the bolt 44 is engaged in the recess 46, which it enters the moment the plug 31 is ejected. Thus after the device has operated the jaws 38 will be in position to again receive the ball 36 when it is desired to readjust the mechanism. After the ball 36 and jaws 38 have been reëngaged the spring 49 and attached pin 50 should be pressed down to force back the bolt 44, and then the tension device will retract the jaws and ball into the conduit. The plug 31 can now be reinserted, care being taken at the same time to engage the cord 23 with said plug.

It will be observed that the pivotally-connected jaws 38 and block 40 serve as a coupling between the ball-carrying cord 34 and take-up 47 and that by means of the take-up mechanism the said coupling and ball have a tendency to move inward along the conduit in opposition to any slight strains on the cord 34, attached to the riding-habit. The cord 34 should have a sufficient length so that it will not draw the coupling-jaws against the plug 31 as long as the rider remains on the saddle; but should the rider fall or be thrown the jaws 38 will be drawn forcibly against the plug 31, thereby ejecting the same and causing it to draw on the retracting-cord 23 and release the pommel 11, so that it will slide off from the saddle, and thus obviate the usual danger of having the rider's dress catch thereon. The ball 36 will become released from the jaws 38 as soon as the plug 31 is ejected, and the block 40 will be automatically retained at the entrance to the conduit 24 in readiness for again connecting up the mechanism for future use. It may be preferable to provide the jaws 38 with rollers 51 to facilitate easy movement along the conduit or guideway.

What I claim as my invention is—

1. The combination with a riding-saddle, of a detachable pommel having a recess in its under side, a retractable dowel provided with locking mechanism to normally engage and secure the recessed pommel, and detachable connections for retracting the locking mechanism and dowel to release the pommel in case the rider is thrown.

2. The combination with a riding-saddle, and a detachable pommel of a retractable dowel provided with bolts to normally engage and secure the pommel, and detachable mechanism adapted to connect with the rider for retracting the said bolts and dowel and releasing the pommel in case the rider is thrown.

3. The combination with a riding-saddle, and a detachable pommel, of a retractable and yieldingly-supported dowel to normally engage and secure the pommel, and detachable mechanism for retracting the said dowel and releasing the pommel in case the rider is thrown.

4. The combination with a riding-saddle, and a detachable pommel, of a retractable dowel provided with locking mechanism for normally securing the pommel in position, and pull mechanism to connect with the rider and release the pommel in case the rider is thrown.

5. The combination with a riding-saddle, and a detachable pommel, of locking mechanism for normally securing the pommel in position, a retracting-cord for said locking mechanism, a conduit through which said cord is extended, a grooved and perforated plug to detachably engage said cord and close the end of the conduit, a cord extended through the perforation of said plug and adapted to be attached to the rider, a ball secured to the inner end of said cord, sliding jaws placed in the conduit and detachably engaged with said ball, and a take-up connected with said jaws.

6. The combination with a riding-saddle, and a detachable pommel, of locking mechanism for normally securing the pommel in position, devices for retracting said locking mechanism to release the pommel, a slide-block provided with pivotally-connected jaws, a cord adapted to connect with the rider and having at one end a ball to be normally and detachably confined by said jaws, a take-up for said slide-block and jaws, and means for locking the slide-block on release of the pommel.

In testimony whereof I have hereunto set my hand in presence of two subscribing witnesses.

PERLAI W. PETERS.

Witnesses:
HOWARD M. NORRIS,
F. B. KEEFER.